| United States Patent [19] | [11] Patent Number: 4,845,522 |
|---|---|
| Kataoka | [45] Date of Patent: Jul. 4, 1989 |

[54] DATA COMMUNICATION SYSTEM FOR CAMERA SYSTEM

[76] Inventor: Hiroyuki Kataoka, c/o Canon Kabushiki Kaisha, 3-30-2, Shimomaruko, Ohta-ku, Tokyo, Japan

[21] Appl. No.: 112,280

[22] Filed: Oct. 26, 1987

[30] Foreign Application Priority Data

Nov. 4, 1986 [JP] Japan ................................ 61-262452
Dec. 11, 1986 [JP] Japan ................................ 61-293449

[51] Int. Cl.⁴ ...................... G03B 15/05; G03B 17/56; G06F 11/00
[52] U.S. Cl. .................................. 354/412; 354/413; 354/145.1; 371/61; 371/62
[58] Field of Search ...................... 354/412, 413, 145.1, 354/286, 295; 371/32, 61, 62

[56] References Cited

U.S. PATENT DOCUMENTS

| 4,023,109 | 5/1977 | Shreve | 371/62 X |
| 4,392,226 | 7/1983 | Cook | 371/61 |
| 4,589,066 | 5/1986 | Lam et al. | 371/61 X |
| 4,644,497 | 2/1987 | Tajima et al. | 371/61 X |
| 4,695,148 | 9/1987 | Terui et al. | 354/145.1 X |
| 4,705,970 | 11/1987 | Turnpaugh | 371/62 X |

Primary Examiner—W. B. Perkey

[57] ABSTRACT

A data communication system in which data communication between a camera and an accessory such as a strobe is performed by transmitting items of data in sequence in synchronism with clock pulses. If the data communication is not performed normally, the system detects an error in this communication, and the operation of performing data communication using these items of data is recommenced.

5 Claims, 5 Drawing Sheets

DATA COMMUNICATION SYSTEM FOR CAMERA SYSTEM

BACKGROUND OF THE INVENTION

1. Field of the Invention

This invention relates to a clock-synchronized serial data communication system which is provided for communication between a camera possessing a microcomputer or the like and certain accessories (strobe, lens, etc.) that may be attached to the camera and, more particularly, to a system of this type capable of preventing any malfunction in data communication.

2. Description of the Prior Art

Systems for performing data communication between devices have been known, in the past. For example, U.S. Pat. Nos. 4,320,518 and 4,367,936 disclose data communication between two circuits, U.S. Pat. No. 4,588,274 discloses communication between a data transcribing apparatus and a camera, U.S. Pat. No. 4,512,644 discloses data communication from a camera to a strobe, and U.S. Ser. No. 688,355 discloses data communication between a camera and a lens system in which data is interchanged between the camera and the lens system in synchronism with clock pulses. These examples do not disclose any techniques for resetting data when a data communication cannot be performed normally. The last above-mentioned type of the methods of performing clock-synchronized serial data communication between different pieces of equipment such as a camera, a strobe and a lens system makes use of a data communication system such as that shown in FIG. 1.

Figure 1:
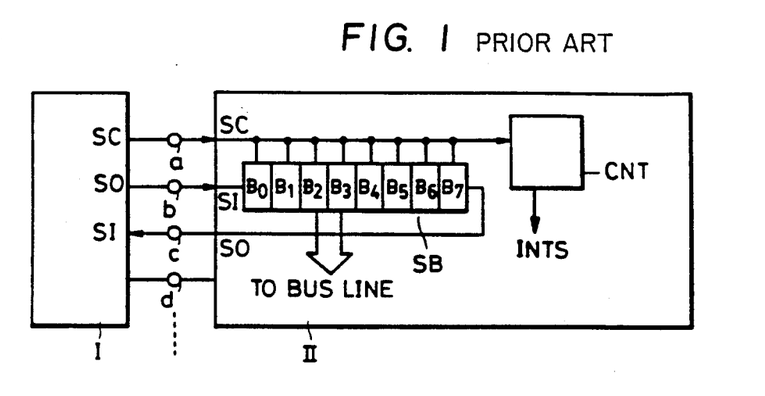
FIG. 1 is a circuit diagram of an example of a conventional data communication system.

FIG. 1 shows microcomputers I and II which are provided in a camera and an associated accessory, respectively. The microcomputers are interconnected through terminals a to d. The terminal a forms a clock pulse line. In synchronism with the supply of a clock pulse on this line, data is transmitted from the microcomputer I to the microcomputer II or from the microcomputer II to the microcomputer I via data lines b and c, respectively, thereby effecting intercommunication between these computers. A shift register SB which is provided in the microcomputer II into which items of data is serially input via the line b in synchronism with clock pulses supplied via the line a, as well as data in the register SB, is transmitted to the microcomputer I via the line c. A 3-bit counter CNT issues a communication completion signal when it detects the completion of supply of 8 clock pulses effected via the line a. A reference symbol d denotes a ground line.

In this arrangement, at the time of communication, clock pulses are sent from a serial clock terminal SC of the microcomputer I to a serial clock terminal SC of the microcomputer II via the line a.

Simultaneously, items of data from a serial output SO of the microcomputer I are transmitted to a serial input SI of the microcomputer II in synchronism with the clock pulses and are successively input into the shift register SB. The shift register SB is thus supplied with data from the microcomputer I, and successively transmits items of data which have been stored in it to the serial input terminal SI of the microcomputer I via the serial output terminal SO and the line c in synchronism with the above-described clock, thus effecting intercommunication between the microcomputers I and II.

Since the shift register SB is constructed with an 8-bit configuration, the above communication data is also provided in the 8-bit form. The counter CNT detects that data.

That is, the counter CNT is a 3-bit counter which outputs a communication completion signal INTS by counting 8 clock pulses. This system, therefore, detects data communication.

As described above, in this type of system, data communication is performed on the basis of clock pulses supplied via the clock line a. Therefore, if noise occurs on the clock line a, there is a possibility of the shift register SB starting a shifting operation and, hence, a change in the set data in the shift register SB.

SUMMARY OF THE INVENTION

It is an object of the present invention to provide a data communication system which is capable of effecting accurate data communication by immediately recommencing the operation of data communication and resetting correct data if there is a possibility of interference with the transmitted data.

To this end, the present invention provides in one of its aspects a data communication system in which items of data from a camera are transmitted in sequence to a data input circuit of an associated accessory in synchronism with clock pulses supplied through a clock pulse line, the system having a detection circuit which detects pulses of noise on the clock pulse line and which is arranged such that the operation of performing data communication is recommenced when a noise is detected by the detection circuit.

The present invention provides in another of its aspects a data communication system for performing the above process in which the detection circuit produces an output when the number of pulses on the clock pulse line fails to correspond to a predetermined number needed for data communication, and in which the data communication process using the above data is recommenced if the predetermined number of pulses has not been supplied.

The present invention provides in another of its aspects a data communication system for performing the above process in which the period between clock pulses supplied to the clock pulse line is detected, and in which the data communication process using the above data is recommenced if the next clock pulse is not supplied to the clock pulse line within the predetermined period of time in which an item of data is transmitted.

The present invention comprises first and second data circuits, a detection circuit and a control circuit. The first data circuit is provided in a camera and has a first clock terminal through which clock pulses are output and a first data terminal through which data is output in sequence and in synchronism with the clock pulses. The first data circuit supplies the clock pulses to the first terminal during data communication. The second data circuit is provided in an accessory for the camera and has a second clock terminal connected to the first data circuit by a clock line and a second data terminal connected to the first data terminal by a data line. The second data circuit also has an input memory into which data supplied through the second data terminal is input in sequence and in synchronism with the clock pulses supplied through the clock line during data communication. The detection circuit in one aspect detects incorrect performance of the data communication and the control circuit recommences data communication when the detection circuit has detected such incorrect performance.

In another aspect the detection circuit is adapted to detect on the clock line an error signal other than the clock pulse supplied during said data communication and to generate an output in response to the detection. The control circuit in this aspect recommences data communication between the data circuits in response to the output.

In a further aspect the detection circuit detects the occurrence of a pulse on the clock line at a time apart from the period of time during which the data communication is performed and the control circuit recommences the data communication when the detection circuit detects the occurrence of a pulse at a time apart from the period of time during which the data communication is performed.

Other objects and features of the present invention will become clear upon reading the following description of the preferred embodiments in conjunction with the accompanying drawings.

DETAILED DESCRIPTION OF THE PREFERRED EMBODIMENTS

Figure 2:
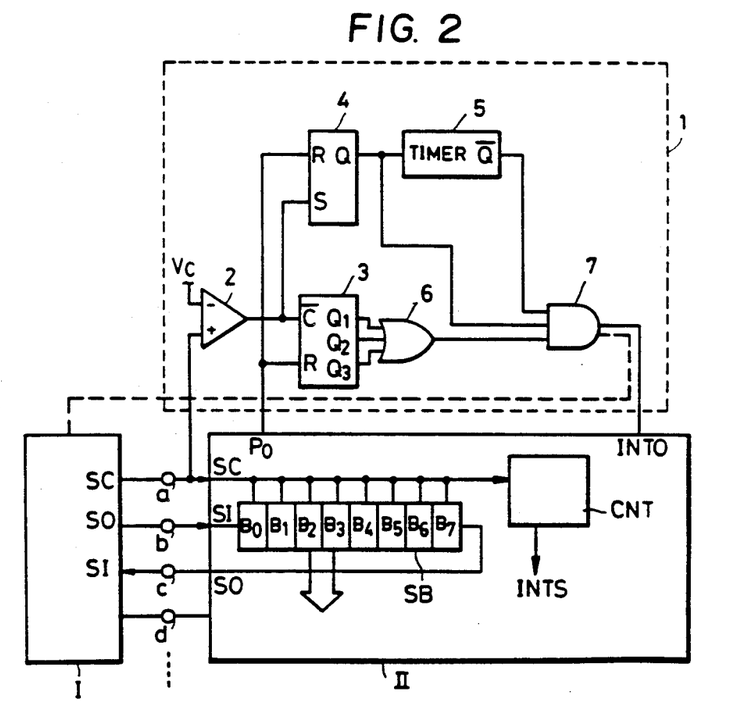
FIG. 2 is a circuit diagram of a data communication system in a camera system which represents an embodiment of the present invention.

FIG. 2 shows a circuit diagram of a data communication system which represents an embodiment of the present invention. In FIG. 2, the same components as those shown in FIG. 1 have the same reference characters. The arrangement of the data communication unit in the system shown in FIG. 2 is the same as the conventional arrangement shown in FIG. 1, but the system shown in FIG. 2 is provided with a communication error detecting unit 1.

A comparator 2 which is provided in this communication error detecting unit 1 has a minus (−) input which is connected to a reference voltage Vc, and a plus (+) input terminal which is connected to the line a. The reference voltage Vc is set to be about half of the voltage of the clock pulses. The unit is also provided with a flip-flop 4 which is set in response to a change in the level of the signal from the comparator 2 from high level to low level so as to make high the level of an output Q, a one-shot circuit 5 which has an output $\overline{Q}$ which is generated as a negative pulse for a certain period of time by the change in the output from the flip-flop 4 to a high level, a 3-bit counter 3 which counts a signal representing the change in the output from the comparator 2 to a low level, an OR gate 6, and an AND gate 7. The above period of time during which the negative pulse is issued from the one-shot circuit 5 is set to be slightly longer than the time during which clock pulses needed for communication are generated (which, in this case, corresponds to the supply of 8 pulses).

Figure 4:
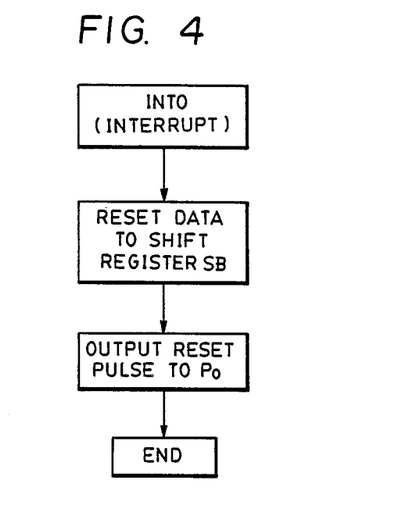
FIG. 4 is a flow chart of a program incorporated in the microcomputer II shown in FIG. 2.

The microcomputer II in an accessory (e.g. a strobe) has a program which is shown in FIG. 4 and which will be described later. The microcomputer II is arranged in such a manner that it starts the program processing shown in FIG. 4 by inputting a high level signal from the AND gate 7 into its input terminal INTO.

The operation of the embodiment shown in FIG. 2 will now be described with reference to the waveform diagram of FIG. 3.

The communication operation is commenced in response to a communication instruction from the microcomputer I. That is, a clock pulse is issued from the terminal SC of the microcomputer I in the camera at the time $t_0$, as shown in FIG. 3, and the register SB performs a shifting operation in synchronism with this pulse, so that data from the terminal SO of the microcomputer I is input into the register SB and, at the same time, the past content (data) of the register SB is sent to the microcomputer I via the line c, thereby performing data intercommunication. This process is the same as that in the case of the conventional system.

While the above process of data communication is being performed, the clock pulses supplied via the line a are compared with the reference voltage Vc by the comparator 2, and the comparator 2 issues a low-level signal each time a clock pulse is supplied. The low-level signal from the comparator 2 is transmitted to the flip-flop 4, the flip-flop 4 is set at the time $t_0$, and the one-shot circuit 5 issues a low-level signal through the terminal $\overline{Q}$ for a certain period of time.

The counter 3 counts the number of low-level signals supplied from the comparator 2. When the number of low-level signals counted by counter 3 reaches 8, all of the outputs through terminals $Q_1$ to $Q_3$ become low level. As described above, the comparator 2 issues a low-level signal each time a clock pulse is supplied, and the data communication signals are supplied on the basis of 8 pulses. Therefore, when a normal operation is performed, all of the outputs of the counter 3 become low level. Accordingly, in this case, the AND gate 7 is retained at low level, so that there is no possibility of the terminal INTO of the microcomputer II in the accessory being supplied with any high-level signal. Therefore, the program shown in FIG. 4 will not be executed, and the data communication sequence is terminated.

Next, the operation of the embodiment will be described below with respect to the case where noise occurs on the line a.

Figure 3:
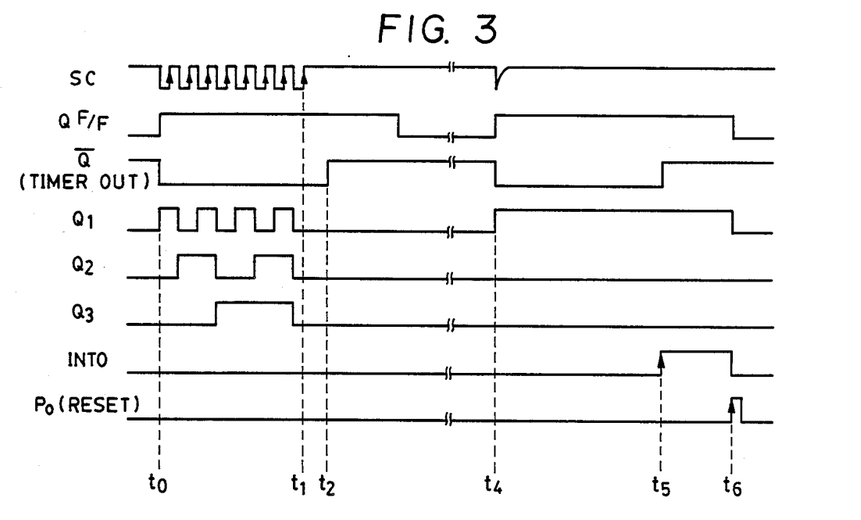
FIG. 3 is a waveform diagram of the operation of the embodiment shown in FIG. 2.

If noise occurs on the line a at the time $t_4$ indicated in FIG. 3, this noise causes the shift register SB to start a shifting operation so as to change the data. To cope with this problem, the detecting unit 1 operates so as to prevent such trouble.

That is, when noise occurs as described above, the comparator 2 issues a low-level output so that the flip-flop 4 is set in the same manner as that described above; and the low level signal is output as the output $\overline{Q}$ from the one-shot circuit 5 for a certain period of time. The counter 3 operates to count up in response to the low level supplied from the comparator 2 and makes the output $Q_1$ a high level. After, in this state, a period of time which is slightly longer than the time basically needed for the normal communication has passed, the output $\overline{Q}$ of the one-shot circuit 5 is returned to high level. Since, at this time, a high level signal is also being issued from the flip-flop 4 while a high level signal is being issued as the output $Q_1$ from the counter 3, the AND gate 7 issues a high-level signal at the time $t_5$ when the output $\overline{Q}$ of the one-shot circuit 5 is returned to high level, so that this high level signal from the AND gate 7 is transmitted to the terminal INT0 of the microcomputer II. The microcomputer II executes the program shown in FIG. 4, performs the above data communication, resets data in the register SB, and thereafter issues a reset pulse through a terminal $P_0$, thereby returning the flip-flop 4 and the counter 3 to the initial state.

In the above-described operation, the content of the register SB is reset and data which is constantly accurate is stored in the register SB even if the data is changed when noise occurs.

The reset pulse from the terminal $P_0$ is also issued at the time of commencement of normal data communication so as to set the detecting unit 1 to the initial state.

This embodiment has been described with respect to the operation at the time of generation of noise, and the reset of data is also effected in a similar manner in the case where the number of clock pulses generated on the line a is not normal.

Examples of data, which is transmitted via the line b from the microcomputer I in the camera to the strobe provided as an accessory, are items of photography information such as ISO information and focal length information set on the camera side. In the strobe, the operation adjusting the amount of flash and the illuminating angle is performed on the basis of these items of data.

An example of data, which is transmitted to the camera via the data line c, is aperture data which is used for determining the aperture for flash photography and which is obtained by pre-emission of the strobe.

Figure 7:
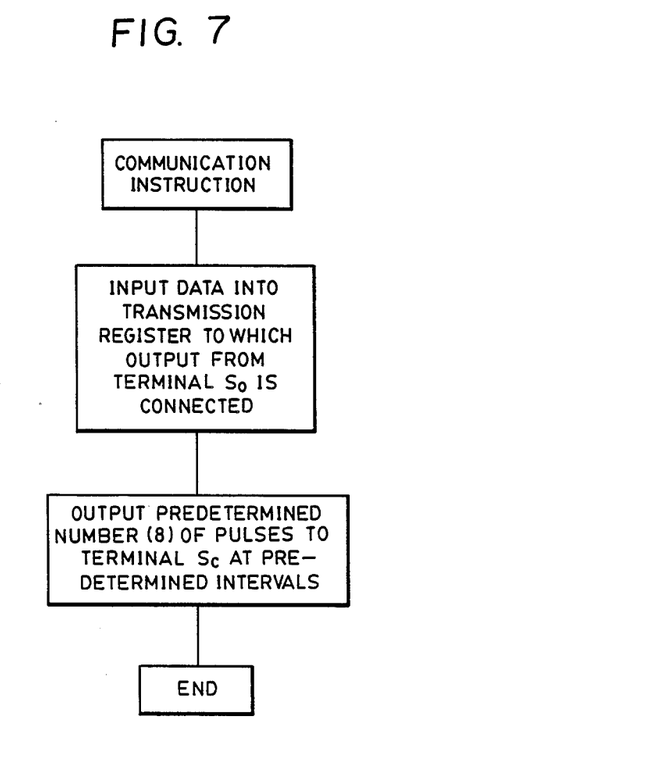
FIG. 7 is a flow chart of a program incorporated in the microcomputer I.

The above-described communicating operation at the time of occurrence of error has been exemplified by the operation of resetting data by the microcomputer II when an error occurs. Alternatively, the operation of resetting data in the register SB may be performed in such a manner that the output terminal of the AND gate 7 is connected to the microcomputer I as indicated by the line in FIG. 2, and the data is reset on the basis of a program, such as that shown in FIG. 7, which is incorporated in the microcomputer I. The program shown in FIG. 7 is a communication program for performing normal data communication and is used by the microcomputer I to carry out normal data communication in response to a communication instruction. In this case, it is necessary to connect the output terminal of the AND gate 7 to the terminal INT0 of the microcomputer II so that the microcomputer II outputs a reset pulse through terminal $P_0$ to the terminal R when the output from the AND gate 7 is input into the terminal INT0, thereby resetting the circuit 1.

Figure 5:
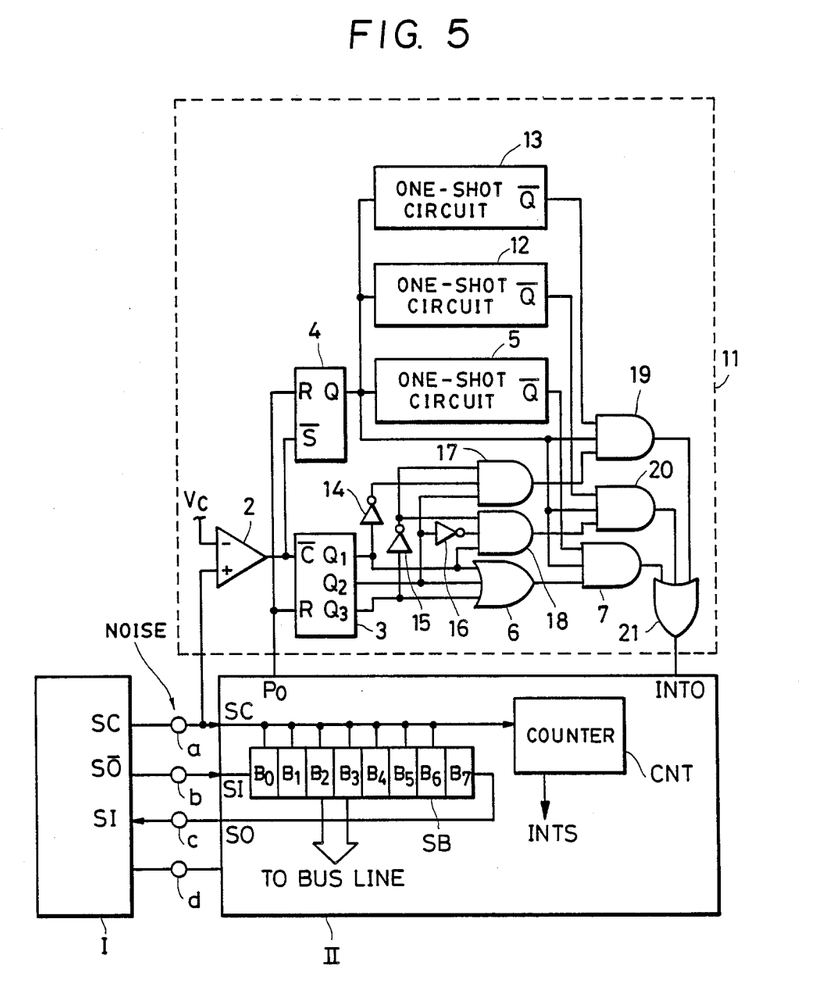
FIG. 5 is a circuit diagram of another embodiment of the present invention.

Another embodiment of the present invention will be described below with reference to FIG. 5 which is a circuit diagram of this embodiment and in which the same components as those shown in FIG. 2 are indicated by the same reference characters. An error detecting circuit 11 shown in FIG. 5 is further provided with, in addition to the circuits shown in FIG. 2, a one-shot circuit 12 which outputs a negative pulse for a certain period of time (slightly longer than that for one clock pulse (the period of time between $t_{10}$ and $t_{11}$ in FIG. 6)) by the change in the output from the flip-flop 4 from low level to high level, a one-shot circuit 13 which outputs a negative pulse for a certain period of time (slightly longer than that for two clock pulses (the period of time between $t_{10}$ and $t_{12}$ in FIG. 6)) by the change in the output from the flip flop 4 from low level to high level, and inverters 14 to 16 which generate inverting signals from outputs from the output terminals $Q_1$ to $Q_3$ of the counter 3, respectively, 3-input AND gates 17 to 20, and a 3-input OR gate 21. The microcomputer II performs the program processing shown in FIG. 4 in the same manner as that described above when it is supplied with a high-level signal through the input terminal INT0.

The operation of this embodiment will now be described with reference to FIG. 6. When the microcomputer I starts to issue a clock pulse through the output terminal SC at the time $t_{10}$ in FIG. 6, the comparator 2 compares this clock pulse with the reference voltage Vc. The comparator 2 outputs a high-level signal each time a clock pulse is generated. The flip-flop 4 is thereby set at the time $t_{10}$, and the one-shot circuits 5, 12 and 13 then start to operate so as to output signals, which have been inverted to a low level, through their output terminals $\overline{Q}$ for predetermined periods of time shown in FIG. 6. The binary counter 3 counts the number of low-level signals supplied from the comparator 2. When the count content becomes, for example, "1", the counter outputs, through the output terminals $Q_1$ to $Q_3$, signals which represent 3-bit data [0, 0, 1]. These signals are supplied via the inverters 14 to 16, so that the output from the AND gate 18 becomes high level at this time. When the count content becomes "2", the counter outputs, through the output terminals $Q_1$ to $Q_3$, signals which represent 3-bit data [0, 1, 0], so that, in this case, the output from the AND gate 17 becomes high level. When the count content becomes "7", the counter outputs, through the output terminals $Q_1$ to $Q_3$, signals which represent 3-bit data [1, 1, 1], so that, in this case, each of the outputs from the AND gates 17 and 18 becomes high level, as shown in FIG. 6.

Figure 6:
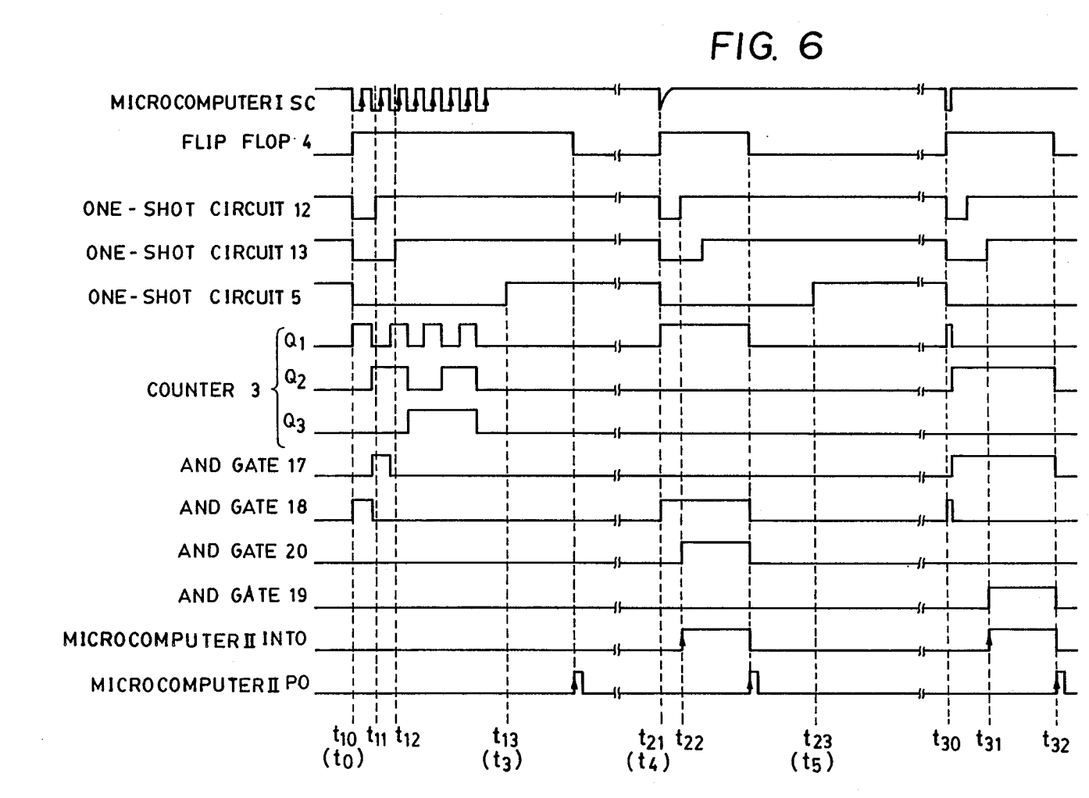
FIG. 6 is a waveform diagram of the operation of the embodiment shown in FIG. 5.

In the case where the comparator 2 has been supplied with a prescribed number of clock pulses in sequence, any one of the outputs from the AND gates 7, 19 and 20 is not inverted to high level, as is understood from the time chart shown in FIG. 6. Accordingly, the output of the OR gate 21 is not inverted to high level, thereby inhibiting the program shown in FIG. 4 from being executed by the microcomputer II.

When a clock pulse is issued from the microcomputer I through the output terminal SC, the shift register SB starts the shifting operation, thereby effecting a normal intercommunication between the microcomputers I and II. This process is the same as that in the case of the system shown in FIG. 2.

The operation of this system performed when noise occurs will be described below. If noise occurs at the time $t_{21}$ in FIG. 6, the output from the comparator 2 is inverted to low level, and, in response to this, the flip flop 4 is set so that the outputs from the one-shot circuits 5, 12 and 13 are inverted to a low level, as described above. After a period of time which is slightly longer than the time for one clock pulse, the output from the one-shot circuit 12 is returned to high level at the time $t_{22}$ in FIG. 6. At this time, the counter has counted up in response to the noise, and only the output from the output terminal $Q_1$ is a high level so that the output from the AND gate 18 is high level. Therefore, all of the input terminals of the AND gate 20 is supplied with high-level signals, and a high-level signal is output from the AND gate 20 via the OR gate 21 at the time $t_{22}$. The microcomputer II executes the program shown in FIG. 4 after a very short period of time from the time $t_{21}$ to $t_{22}$ has passed, thereby resetting data in the shift register SB.

FIG. 6 shows, in a section after the time $t_{30}$, the case where two pulses of noise occurs. In this case, after a period of time which is slightly longer than the time for two clock pulses, the output from the one-shot circuit 13 is returned to high level at the time $t_{31}$ in FIG. 6. Since, at this time, each of the outputs from the flip flop 4 and the AND gate 17 is a high level, all of the input terminals of the AND gate 19 are supplied with high-level signals, so that a high-level signal is output from the AND gate 19 via the OR gate 21 at the time $t_{31}$. The microcomputer II executes the program shown in FIG. 4 after a very short period of time has passed from the time $t_{31}$ to $t_{32}$, thereby resetting data in the shift register SB.

In the above description, the operation in accordance with the present invention has been exemplified by the case where one or two pulses of noise occurs, but it is within the scope of the invention to provide additional circuits of the same type which makes it possible to rapidly detect the occurrence of abnormal pulses even when the number of these pulses is greater than two e.g. three to seven.

In accordance with the present invention, as described above, when the occurrence of noise on the clock pulse line is detected during a data communication, the data communication is recommenced. Therefore, even if the data which has transmitted is changed, the correct data is immediately transmitted again and is reset, thus enabling accurate data communication between a camera and an accessory such as a strobe.

What is claimed is:

1. A system for effecting data communication between a camera and an accessory attached to said camera, said system comprising:
   a first circuit provided in said camera and having a first clock terminal for transmitting clock pulses therethrough, and a first data terminal for data communication performed in sequence and in synchronism with said clock pulses, wherein a clock circuit supplies said clock pulses to said system during data communication;
   a second circuit provided in said accessory and having a second clock terminal connected to said first clock terminal of said first circuit by a clock line, and a second data terminal connected to said first data terminal by a data line, wherein said second circuit effects data communication with said first circuit by supplying said the clock line with said clock pulses;
   an error signal detecting circuit adapted to detect on said clock line an error signal, said detecting circuit having a timer which operates to set a time interval by detecting a pulse on said clock line, and a counting circuit which counts the number of pulses on said clock line and determines the occurrence of an error when a predetermined number of pulses is not counted during the time interval set by said timer.

2. A system according to claim 1, wherein the time interval set by said timer is longer than that necessary for data communication, and wherein said error signal detecting circuit generates an output indicating the occurrence of an error when the number of pulses counted during the time interval set by said timer within the counting circuit is different from the predetermined number of pulses needed for said data communication.

3. A system according to claim 2, further comprising a control circuit disposed for transmitting data between said first and second circuits in response to the output from said detecting circuit.

4. A system for effecting data communication between a camera and an accessory attached to said camera, said system comprising:
   a first circuit provided in said camera and having a first clock terminal for transmitting clock pulses therethrough, and a first data terminal for data communication performed in sequence and in synchronism with said clock pulses, wherein a clock circuit supplies said clock pulses to said system during data communication;
   a second circuit provided in said accessory and having a second clock terminal connected to said first clock terminal of said first circuit by a clock line, and a second data terminal connected to said first data terminal by a data line, said second circuit effecting data communication with said first circuit by supplying said clock line with said clock pulses; and
   an error signal detecting circuit adapted to detect on said clock line an error signal, said error signal detecting circuit having:
      a timer circuit which performs a timing operation for a first duration, longer than that necessary for counting a predetermined first number of said clock pulses, and which performs a timing operation for a second duration, longer than that necessary for counting a second predetermined number of said clock pulses which is more than the predetermined first number of said clock pulses, said timer circuit starting its timing operation after detecting the pulses on said clock line; and
      a detecting circuit having a counter circuit which counts pulses on said clock line and determines the occurrence of an error when the predetermined first number of pulses is not counted in said counter circuit within the first duration or when the predetermined second number of pulses is not counted within the second duration.

5. An error detecting circuit used for a system for effecting data communication between a camera and an accessory attached to said camera, said system having:
   a first circuit provided in said camera and having a first clock terminal for transmitting clock pulses therethrough, and a first data terminal for data communication performed in sequence and in synchronism with said clock pulses, wherein a clock circuit supplies said clock pulses to said system during data communication;
   a second circuit provided in said accessory and having a second clock terminal connected to said first clock terminal of said first circuit by a clock line, and a second data terminal connected to said first data terminal by a data line, said second circuit effecting data communication with said first circuit by supplying said clock line with said clock pulses; and
   an error signal detecting circuit adapted to detect on said clock line an error signal, said detecting circuit having:
      a timer operated by detecting pulses on said clock line; and
      a counting circuit for counting the number of pulses on said clock line, and for determining the occurrence of an error when a predetermined number of pulses is not counted on said clock line within a predetermined time determined by said timer.

* * * * *

UNITED STATES PATENT AND TRADEMARK OFFICE
CERTIFICATE OF CORRECTION

PATENT NO. : 4,845,522         Page 1 of 2
DATED      : July 4, 1989
INVENTOR(S) : Kataoka It is certified that error appears in the above-identified patent and that said Letters Patent is hereby corrected as shown below:

On the title page:

AT [57]:

Insert --Attorney, Agent, or Firm - Fitzpatrick, Cella, Harper & Scinto--.

COLUMN 1:

Line 45, change "is" to --are--;

COLUMN 6:

Line 3, change "flip flop 4" to --flip-flop 4--;

Line 56, change "flip" to --flip- --; and

Line 66, change "is" to --are--.

UNITED STATES PATENT AND TRADEMARK OFFICE
CERTIFICATE OF CORRECTION

PATENT NO. : 4,845,522

DATED : July 4, 1989

INVENTOR(S) : Kataoka

Page 2 of 2

It is certified that error appears in the above-identified patent and that said Letters Patent is hereby corrected as shown below:

<u>COLUMN 7</u>:

Line 9, change "flip flop" to --flip-flop--;

Line 23, change "two e.g." to --two, e.g.--; and

Line 49, change "said the clock line" to --said clock line--.

Signed and Sealed this

Twenty-second Day of May, 1990

Attest:

HARRY F. MANBECK, JR.

Attesting Officer      Commissioner of Patents and Trademarks